(12) United States Patent
Nishikaji

(10) Patent No.: US 7,410,026 B2
(45) Date of Patent: Aug. 12, 2008

(54) SEATBELT DEVICE OF VEHICLE

(75) Inventor: Satoshi Nishikaji, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 420 days.

(21) Appl. No.: 11/205,206

(22) Filed: Aug. 17, 2005

(65) Prior Publication Data

US 2006/0065466 A1  Mar. 30, 2006

(30) Foreign Application Priority Data

Sep. 29, 2004  (JP)  ............... 2004-283671

(51) Int. Cl.
B60R 21/00  (2006.01)
(52) U.S. Cl. .................................. 180/268
(58) Field of Classification Search ................ 180/268; 280/806, 807; 303/146, 151
See application file for complete search history.

(56) References Cited

U.S. PATENT DOCUMENTS

| | | | |
|---|---|---|---|
| 6,394,495 B1 | 5/2002 | Specht | |
| 6,421,591 B1 | 7/2002 | Hackenberg | |
| 7,250,850 B2 * | 7/2007 | Mizutani | 340/435 |
| 2003/0209900 A1 * | 11/2003 | Tobata | 280/807 |
| 2004/0017073 A1 | 1/2004 | Pavlov et al. | |
| 2004/0080204 A1 * | 4/2004 | Enomoto et al. | 297/480 |
| 2004/0108706 A1 * | 6/2004 | Enomoto | 280/807 |

FOREIGN PATENT DOCUMENTS

| | | |
|---|---|---|
| DE | 198 11 865 A1 | 9/1999 |
| EP | 0 747 272 A2 | 12/1996 |

OTHER PUBLICATIONS

European Search Report Application No. EP 05 01 7132 dated Dec. 16, 2005.

* cited by examiner

*Primary Examiner*—Eric Culbreth
*Assistant Examiner*—Nicole Verley
(74) *Attorney, Agent, or Firm*—Studebaker & Brackett PC; Donald R. Studebaker

(57) ABSTRACT

The seatbelt device of a vehicle comprises at least two seatbelt mechanisms including the webbings and the first pre-tensioner mechanisms operative to wind up the webbings so as to apply the specified tension to the webbings when the crash pre-detecting device detects the vehicle crash in advance, and the control device to control the seatbelt mechanism, wherein there is provided the vehicle turning control device which operates to control the braking force of the brake device of the vehicle so that the vehicle turning state can be the target turning state, and the control device operates at least the two first pre-tensioner mechanisms when the vehicle, tuning control device operates. Accordingly, the pre-tensioner mechanisms operate additionally when the DSC operates, thereby increasing restraint force of the passengers and improving the safety of the passengers.

6 Claims, 4 Drawing Sheets

FIG. 5

|  | DSC | Brake Assist Mechanism | Crash Pre-Detection |
|---|---|---|---|
| Driver's Seat | Low | High | Low |
| Assistant's Seat | High | High | Low |

SEATBELT DEVICE OF VEHICLE

BACKGROUND OF THE INVENTION

The present invention relates to a seatbelt device of a vehicle, particularly to the seatbelt device in which pre-tensioner mechanisms provided for a driver's seat and another passenger's seat are operated when the vehicle is in a state, such as a spin or lateral slip, and when a DSC to stabilize a vehicle turning state operates during a vehicle turning.

Conventionally, in the seatbelt device of a vehicle equipped with the pre-tensioner mechanism, when the vehicle crash has been detected in advance by the crash pre-detecting sensor comprised of a millimeter-wave radar, based on the relative speed or relative distance with respect to an obstacle, such as the vehicle running in front, the pre-tensioner mechanism operates to wind up a specified amount of the webbing, so that the specified tension can be applied to the webbing and thereby the passenger's restraint can be improved. Then, when it is determined the vehicle dangerous state of crash has been avoided, the pre-tensioner mechanism equipped with an electric motor is driven reversely, so that the webbing is withdrawn by a specified amount and thereby the tension thereof returns to the previous tension before the webbing winding up. Thus, the unpleasant feeling of too much restraint of the webbing can be lessened.

Also, passengers tend to be moved forward due to the inertia at the vehicle braking, and they tend to be moved laterally at the vehicle turning. Accordingly, increasing the webbing tension and thereby improving the passenger's restraint will be necessary in these cases. Thus, the seatbelt device performing such functions is also known. For example, U.S. Patent Application Publication No. 2003/0209900 A1 discloses the device in which there are provided the lateral acceleration sensor and the longitudinal acceleration sensor, and it is determined based on these sensors whether the vehicle is in the braking state or in the turning state. Herein, when it has been determined that the vehicle is in the braking state, the pre-tensioner mechanism operates so that the tension of the webbing of the assistant's seat can be higher than that of the webbing of the driver's seat. While, when it has been determined that the vehicle is in the turning state, the pre-tensioner mechanism operates so that the tension of the webbing of the driver's seat can be higher than that of the webbing of the assistant's seat. Thereby, the tension of the webbing can be properly applied to the passenger according to the vehicle traveling state, and thus the proper restraint can be provided to the passenger without giving any unpleasant feelings.

Meanwhile, vehicles equipped with DSC (Dynamic Stability Control) have increased recently. The DSC can stabilize the vehicle traveling state by controlling the engine brake and the braking forces of four brakes when it has been detected that the vehicle travels on a slippery road or turns at a high speed and thereby the vehicle is in the dangerous state of spin or lateral slip. Herein, it is desired to provide the seatbelt device to operate the pre-tensioner mechanism additionally according to the operation of the DSC in order to further improve the safety of passengers.

SUMMARY OF THE INVENTION

The present invention has been devised in view of this matter, and an object of the present invention is to operate the pre-tensioner mechanism in the seatbelt device of a vehicle additionally when the DSC operates, thereby increasing restraint forces of passengers and improving the safety of passengers.

According to the present invention, there is provided a seatbelt device of a vehicle, comprising at least two seatbelt mechanisms provided for a driver's seat and another passenger's seat, each of the seatbelt mechanisms including a webbing and a first pre-tensioner mechanism operative to wind up the webbing so as to apply a specified tension to the webbing when a crash pre-detecting device detects a vehicle crash in advance, and a control device to control the seatbelt mechanisms, wherein there is provided a vehicle turning control device which operates to control a braking force of a brake device of the vehicle so that a vehicle turning state can be a target turning state, and the control device operates at least the first pre-tensioner mechanisms when the vehicle turning control device operates. Accordingly, even when the vehicle is in the dangerous state such as spin or lateral slip and the vehicle turning control device operates, the first pre-tensioner mechanisms of the passenger's seat and another passenger's seat operate to increase the restraint force of respective passengers, thereby improving the safety of passengers further.

According to a preferred embodiment of the present invention, the control device operates the first pre-tensioner mechanisms when the vehicle turning control device operates so that the tension of the webbing of the driver's seat can be lower than that of the webbing of the passenger's seat. Accordingly, the respective passengers can be restrained with a proper tension according to the respective passenger's seats when the vehicle turning control device operate. For example, since the tension of the webbing of the driver's seat is made lower than that of the webbing of the passenger's seat, necessary steering operation or braking operation by the driver to avoid the vehicle crash will not be prevented. Also, the passenger in the passenger seat can be restrained with the higher tension of the webbing, and thereby the safety can be further improved.

According to another preferred embodiment of the present invention, there is provided a brake assist device, and the control device operates at least the first pre-tensioner mechanisms when the brake assist device operates. Accordingly, even when the brake assist device to assist brake-pedal pressing force operates at the emergency, such as when the vehicle crash against the obstacle in front needs to be avoided, the first pre-tensioner mechanisms of the driver's seat and the passenger's seat operate to wind up the webbings by the specified amount so that the tension of those can be higher. Thereby, the restraint force for the respective passengers can be increased, and the safety of the passengers can be improved surely even if the vehicle is in the dangerous state where the brake assist mechanism operates.

According to another preferred embodiment of the present invention, the control device operates the first pre-tensioner mechanisms so that both the tension of the webbing of the driver's seat and the tension of the webbing of the passenger's seat when the brake assist device operates can be higher than that of the webbing of the driver's seat when the vehicle turning control device operates. Accordingly, the forward movement of the passengers caused by the operation of the brake assist device can be reduced greatly. Thereby, the restraint force for the passengers can be increased, and the safety of the passenger can be improved further.

According to another preferred embodiment of the present invention, the control device operates the first pre-tensioner mechanisms so that the tension of the webbing of the driver's seat and the tension of the webbing of the passenger's seat when the vehicle crash is detected in advance by the crash pre-detecting device can be lower than the tension of the webbing of the driver's seat and the tension of the webbing of the passenger's seat when the brake assist device operates. Accordingly, even when the vehicle is in the dangerous state, such as crashing against the obstacle in front, the first pre-tensioner mechanisms of the driver's seat and the passenger's seat operate, so that the restraint force of the passengers can be increased and thereby the safety of the passengers can be improved further. Also, since the first pre-tensioner mechanisms operate so that the tension of the webbings can be lower than that when the brake assist device operates, the steering operation or braking operation by the driver to avoid the vehicle crash will not be prevented. Also, it is not necessary yet to provide the high tension to the webbing for the passenger in the passenger's seat at the timing it has been detected in advance that the vehicle is in the generous state of crash, therefore the unpleasant feeling of too much restraint of the webbing can be lessened.

According to another preferred embodiment of the present invention, each of the first pre-tensioner mechanisms is driven by an electric motor. Accordingly, the winding up of the webbings can be done surely, and the withdrawal of the webbings after the avoidance of dangerous state can be also attained surely. Also, using such a relatively simple and inexpensive electric motor should be advantageous in manufacturing costs.

According to another preferred embodiment of the present invention, there are provided a crash detecting device to detect the vehicle crash and second pre-tensioner mechanisms which are provided at the respective seatbelt mechanisms to wind up a specified amount of webbing at the vehicle crash, and the seatbelt device is constituted so that when the vehicle crash is detected by the crash detecting device, the second pre-tensioner mechanisms operate in addition to the operation of the first pre-tensioner mechanisms. Accordingly, when the vehicle has crashed against the obstacle, the second pre-tensioner mechanisms of the passenger's seat and the passenger's seat operate, so that the restraint force for the passengers can be increased and the safety of the passengers can be improved surely.

According to another preferred embodiment of the present invention, each of the second pre-tensioner mechanisms is driven by an inflator. Accordingly, the second pre-tensioner mechanisms can operate promptly at the vehicle crash.

Other features, aspects, and advantages of the present invention will become apparent from the following description which refers to the accompanying drawings.

BRIEF DESCRIPTION OF THE DRAWINGS

FIG. 5 is a chart showing a tension which is applied to webbings of a driver's seat and an assistant's seat according to a vehicle state.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

The present embodiment is an exemplified seatbelt device of an automotive vehicle according to the present invention, in which there is provided the DSC (Dynamic Stability Control) device which can stabilize a vehicle turning by controlling a barking force.

Figure 1:
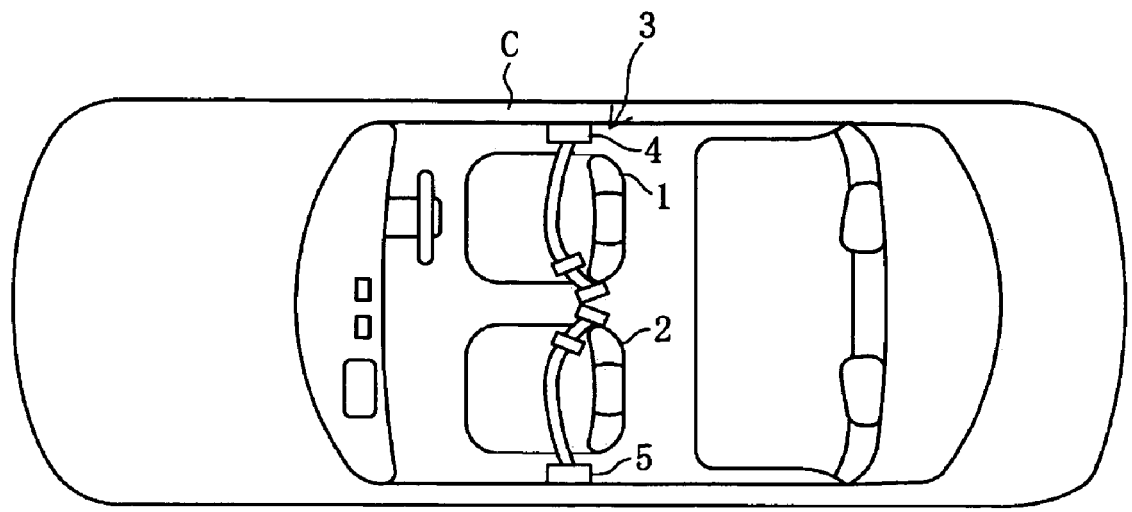
FIG. 1 is a schematic plan view of an automotive vehicle according to an embodiment of the present invention.
Figure 2:
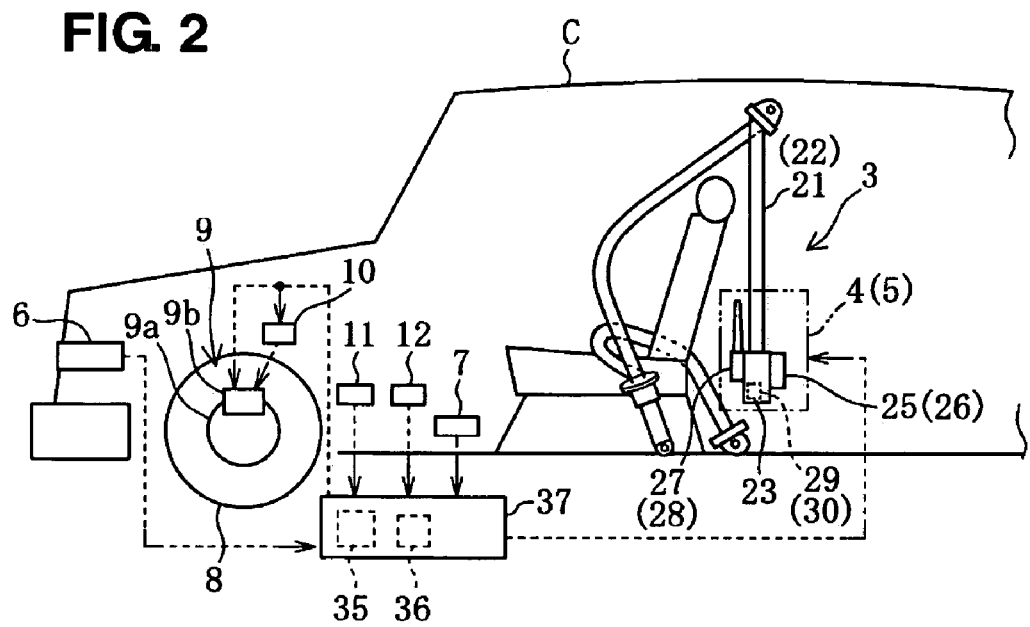
FIG. 2 is a schematic side view of a major part inside the automotive vehicle.

As illustrated in FIGS. 1 and 2, there are provided in the automotive vehicle C a driver's seat 1, an assistant's seat 2, a seatbelt device 3, four brake devices 9 provided at four wheels 8, a brake assist mechanism 10 (corresponding to a brake assist device), an DSC operation sensor 11 to detect whether or not the vehicle is in a dangerous state, such as a spin or lateral slip, and a brake assist operation sensor 12 to detect whether or not a brake pedal (not illustrated) has been pressed at an emergency. Further, there is provided a control device 37 which comprises a DSC control portion 35 (corresponding to a vehicle turning device) to control braking forces of the four brake devices 9 so that the vehicle turning state can be a target turning state, and a brake-assist control portion 36 to control the brake assist mechanism 10.

The seatbelt device 3 comprises a seatbelt mechanism 4 for the driver's seat, a seatbelt mechanism 5 for the assistant's seat, a crash pre-detecting sensor 6 (corresponding to a crash pre-detecting device) to detect the vehicle crash in advance, and a crash detecting sensor 7 (corresponding to a crash detecting device) to detect the vehicle crash. Herein, the crash detecting sensor 6 is constituted of, for example, a millimeter-wave radar, and the pre-detecting sensor 6 is constituted of, for example, an accelerator sensor.

The brake device 9 is constituted of a liquid type of brake which comprises a disc rotor 9*a*, a caliper 9*b*, and the brake assist mechanism 10 including valves such as a pressure-adding valve or a pressure-reducing valve (not illustrated). The brake device 9 is operated by a liquid pressure in a master cylinder (not illustrated) which is generated by pressing of a brake pedal (not illustrated) via a master back (not illustrated), and thereby the braking force is applied to the wheels 8.

The DSC operation sensor 11 comprises a wheel speed sensor 13 to detect a wheel speed of the wheels 8, a lateral acceleration sensor 14 to detect a lateral acceleration acting on the wheels 8 in a lateral direction, a yaw rate sensor 15 to detect a yaw rate acting on the vehicle, a steering angle sensor 16 to detect a steering angle of a steering device, a liquid pressure sensor 17 to detect a liquid pressure in the master cylinder. The DSC operation sensor 11 detects whether or not the vehicle is in the dangerous state such as spin or lateral slip during the vehicle turning based on input signals from the above-described sensors 13 through 17.

Figure 3:
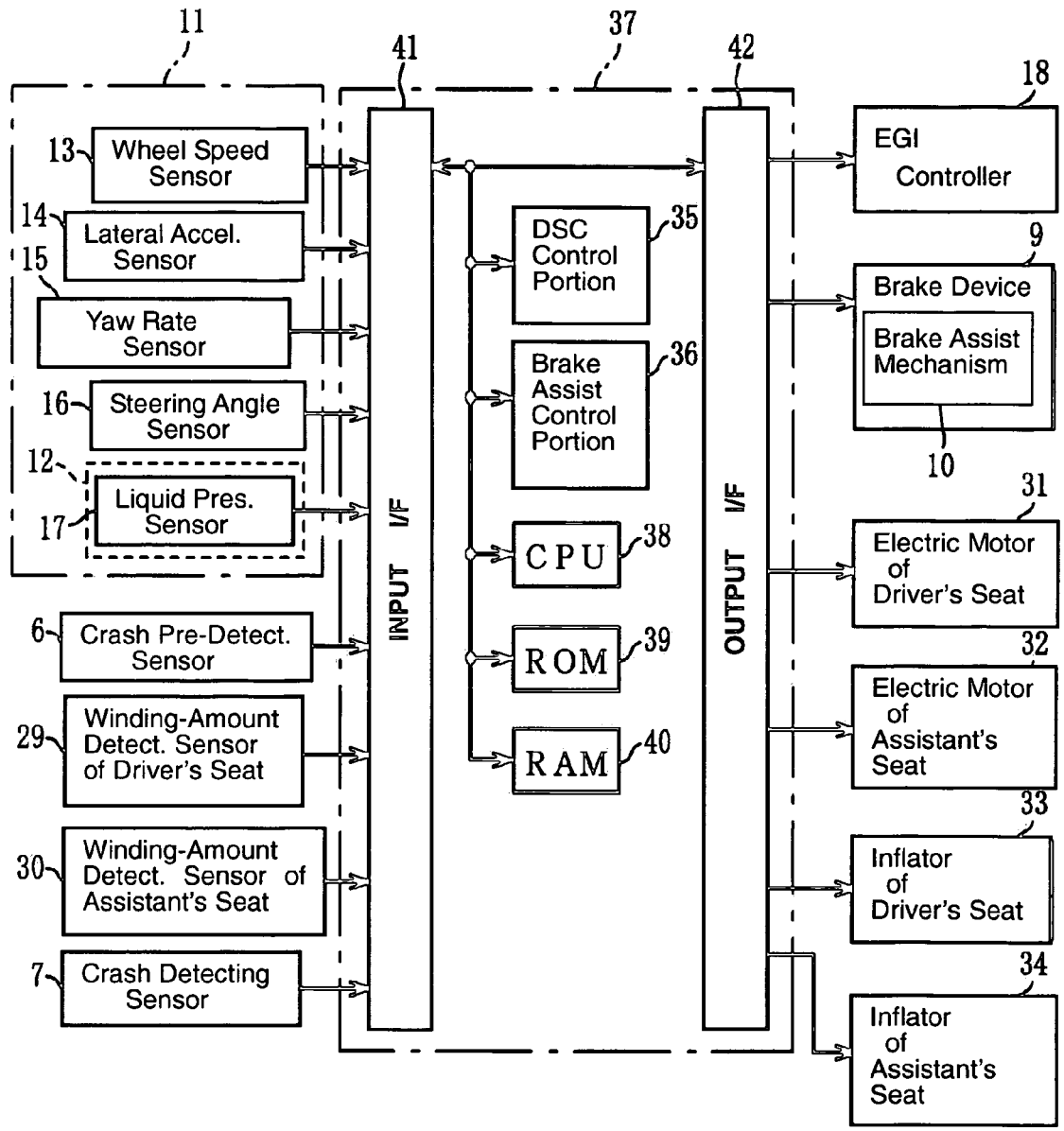
FIG. 3 is a block diagram showing a control system of a seatbelt device.

The DSC comprises the DSC operation sensor 11, the DSC control portion 35, the brake device 9 and an EGI controller 18 (see FIG. 3). And, the DSC controls respective valves with the DSC control portion 35 when it is detected that the vehicle is in the dangerous state such spin or lateral slip by the DSC operation sensor 11. The control is conducted such that the liquid pressure supplied to the brake device 9 are increased or decreased independently to adjust the barking forces applied to the respective wheels 8, so that the vehicle turning state can be controlled so as to be the target turning state. Also, the engine output is reduced by a specified value by the EGI controller 18, thereby a torque down control is executed at the same time.

The brake assist operation sensor 12, which is constituted of the liquid pressure sensor 17 to detect the liquid pressure in the master cylinder, calculates a pressing amount and a pressing speed of the brake pedal based on a detected liquid pressure value of the master cylinder. And, the sensor 12 detects whether or not the brake pedal has been pressed at the emergency.

The brake assist mechanism 10, which is constituted of the valves such as the pressure-adding valve or the pressure-reducing valve, controls the liquid pressure supplied to the brake device 9 by controlling the valves when it is detected by the brake assist operation sensor 12 that the brake pedal has been pressed at the emergency, and thereby generates a specified large braking force.

Next, the seatbelt mechanisms 4, 5 which are provided for the driver's seat 1 and the assistant's seat 2 respectively will be described. The constitution of these seatbelt mechanisms 4 and 5 is substantially the same; and therefore only the seatbelt mechanism 4 for driver's seat will be described.

The seatbelt mechanism 4 comprises, as illustrated in FIG. 2, a webbing 21 to restrain the driver in the seat, a retractor 23 provided at a center pillar (not illustrated) which includes a guide drum (not illustrated) to wind up the webbing 21, a first pre-tensioner mechanism 25 provided integrally at the back face of the retractor 23 which can wind up the webbing 21 with a specified tension when the vehicle crash is detected in advance by the crash pre-detecting sensor 6, and a second pre-tensioner mechanism 27 provided integrally at the front face of the retractor 23 which can wind up the webbing when the vehicle crash has been detected by the crash detecting sensor 7. At the retractor 23 is provided a winding-amount detecting sensor 29 to detect a winding amount of the webbing 21.

The first pre-tensioner mechanism 25 has an electric motor 31 and operates to withdraw and wind up the webbing 21 by driving the electric motor 31. Also, the first pre-tensioner mechanism 25 winds up part of the webbing 21 so as to provide the specified tension to the webbing by driving the electric motor 31, not only when the vehicle dangerous state of crash is detected by the pre-detecting sensor 6 based on a relative speed or a relative distance with respect to an obstacle such a vehicle running in front, but also when the DSC or the brake assist mechanism 10 are operated. Then, when the vehicle dangerous state of crash is not detected after the sate has been avoided or after the operations of the DSC or the brake assist mechanism 10 are finished, the first pre-tensioner mechanism 25 withdraws part of the webbing 21 by driving the electric motor 31 so that the tension of the webbing returns to a previous tension before the webbing winding up.

The second pre-tensioner mechanism 27 has an inflator 33 and operates to wind up part of the webbing 21 at a specified speed, which is faster than the winding-up speed by the first pre-tensioner mechanism 25, so as to provide the specified tension to the webbing by operating the inflator 33 when the vehicle crash has been detected by the crash detecting sensor 7.

Next, a control system of the seatbelt device 3 of the automotive vehicle C will be described referring to FIG. 3. As illustrated in FIG. 3, the control device 37 comprises the DSC control portion 35, the brake-assist control portion 36, CPU 38, ROM 39, RAM 40 (backed up with a secondary battery), Input Interface 41 (Input I/F), Output Interface 42 (Output I/F) and the like. These are coupled via data bus, and to the Input I/F 41 are coupled the wheel speed sensor 13, the lateral acceleration sensor 14, the yaw rate sensor 15, the steering angle sensor 16, the liquid pressure sensor 17, the crash pre-detecting sensor 6, the winding-amount detecting sensor 29 for the driver's seat, a winding-amount detecting sensor 30 for the assistant's seat, and the crash detecting sensor 7. Meanwhile, the brake device 9, the EGI controller 18, the electric motor 31 for the driver's seat, and an electric motor 32 for the assistant's seat. Herein, the Output Interface 39 comprises driving circuits of the electric motors 31, 32 and the inflators 33, 34.

The DSC control portion 35 controls four brake devices 9 and the EGI controller 18 to increase or decrease the braking force based on the input signals from the DSC operation sensor 11, which includes the wheel speed sensor 13, the lateral acceleration sensor 14, the yaw rate sensor 15, the steering angle sensor 16, and the liquid pressure sensor 17, when it is detected that the vehicle is in the dangerous state such as the spin or lateral slip during the vehicle turning, so that the vehicle turning state can be the target turning state.

The brake-assist control portion 36 controls the brake assist mechanism 10 to increase the braking force based on the signal of the brake assist operation sensor 12 comprising the liquid pressure sensor 17 when it is detected that the brake pedal has been pressed at the emergency.

In the ROM 39 of the control device 37 is stored a control program to control the first pre-tensioner mechanism 25 for the driver's seat, a first pre-tensioner mechanism 26 for the assistant's seat, the second pre-tensioner mechanism 27 for the driver's seat, and a second pre-tensioner mechanism 28 for the assistant's seat, based on the input signals from the sensors 6, 13-17, 29, 30.

Figure 4:
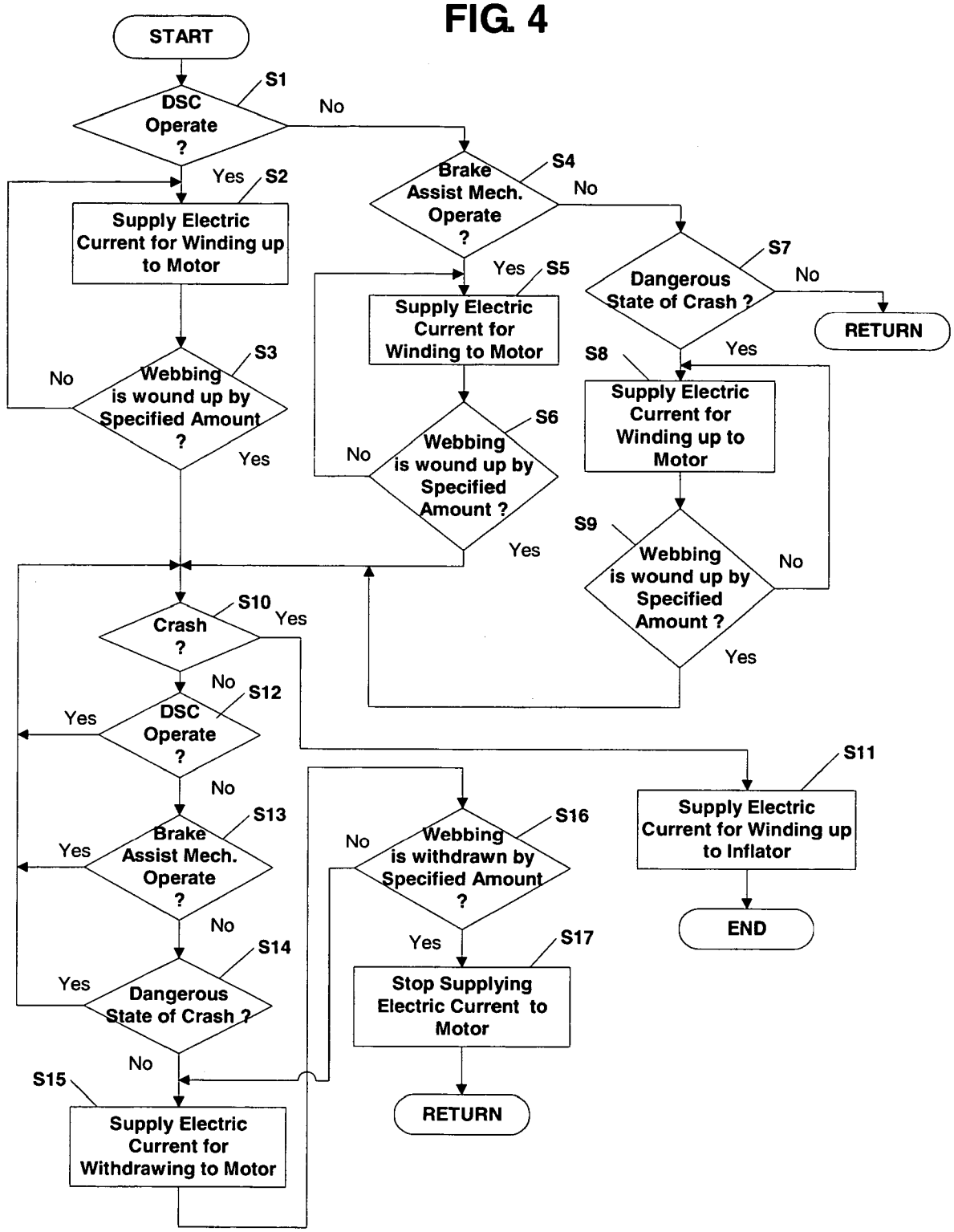
FIG. 4 is a flowchart of a control of a pre-tensioner mechanism.

Next, the control of the first pre-tensioner mechanisms 25, 26 and the second pre-tensioner mechanisms 27, 28 of the seatbelt device 3 which are executed by the control device 37 will be described referring to a flowchart of FIG. 4. Herein, Si (i=1, 2, 3 . . . ) denote respective control steps.

After the control starts by turning on an ignition switch, it is detected based on the signal of the DSC operation sensor 11 whether or not the vehicle is in the dangerous state such as the spin or lateral slip, namely whether the DSC has operated or not (S1). When it is detected that the DSC has operated (S1; Yes), the electric current is supplied to the electric motors 31, 32 of the first pre-tensioner mechanisms 25, 26 for the driver's seat 1 and assistant's seat 2 to wind up the respective webbings 21, 22 (S2). Herein, as illustrated in FIG. 5, the electric current is supplied to the electric motors 31, 32 so that a specified low tension can be provided to the webbing 21 of the driver's seat 1 and a specified high tension can be provided to the webbing 22 of the assistant's seat 2. Namely, when the DSC operates, the electric current is supplied to the motors 31, 32 so that the tension of the webbing 21 of the driver's seat can be lower than that of the webbing 22 of the assistant's seat. Herein, the specified high tension is, for example, about twenty times as large as the specified low tension. The winding amount of the webbings 21, 22 are detected by the winding-amount detecting sensors 29, 30 respectively, and the electric current is supplied until the specified amount of webbings 21, 22 have been wound up (S2, S3; No).

When it is not detected that the DSC operates (S1; No), it is detected by the signal from the brake assist operation sensor 12 at the emergency, namely whether the brake assist mechanism 10 has operated or not (S4). When it is detected that the brake assist mechanism 10 operates (S4; Yes), the electric current to wind up the webbings 21, 22 is supplied respectively to the electric motors 31, 32 of the first pre-tensioner mechanisms 25, 26 of the driver's seat 1 and the assistant's seat 2 to provide the specified high tension as illustrated in FIG. 5 (S5). Namely, the electric current is supplied to the electric motors 31, 32 so that the respective tension of the webbing 21 of the driver's seat and the webbing 22 of the assistant's seat when the brake assist mechanism 10 operates can be higher than that of the webbing 21 of the driver's seat when the DSC operates. The winding amount of the webbings 21, 22 are detected by the winding-amount detecting sensors 29, 30 respectively, and the electric current is supplied until the specified amount of webbings 21, 22 have been wound up (S5, S6; No).

When it is not detected that the brake assist mechanism 10 operates (S4; No), it is detected by the crash pre-detecting sensor 6 whether any obstacle exists in front of the vehicle. When the obstacle exists, the relative speed and relative distance with respect to the obstacle are calculated, and it is detected based on the calculation results whether or not the vehicle is in the dangerous state of crash (S7). When it is detected that the vehicle is in the dangerous state of crash (S7; Yes), the electric current to wind up the webbings 21, 22 is supplied respectively to the electric motors 31, 32 of the first pre-tensioner mechanisms 25, 26 of the driver's seat 1 and the assistant's seat 2 to provide the specified low tension as illustrated in FIG. 5 (S8). Namely, the electric current is supplied to the electric motors 31, 32 so that the respective tension of the webbing 21 of the driver's seat and the webbing 22 of the assistant's seat when the vehicle crash is detected by the crash pre-detecting sensor 6 can be lower than that of the webbings 21, 22 when the brake assist mechanism 10 operates. The winding amount of the webbings 21, 22 are detected by the winding-amount detecting sensors 29, 30 respectively, and the electric current is supplied until the specified amount of webbings 21, 22 have been wound up (S5, S6; No). When it is not detected that the vehicle is in the dangerous state of crash (S7; No), the control sequence returns.

When the specified amount of webbings 21, 22 have been wound up (S3, 6, 9; Yes), it is detected by the crash detecting sensor 7 whether or not the vehicle has crashed against the obstacle (S10). When the vehicle crash has been detected (S10; Yes), the electric current for ignition is supplied to the inflators 33, 34 of the second pre-tensioner mechanisms 27, 28 (S11), so that the webbings 21, 22 of the driver's seat 1 and the assistant's seat 2 are wound up by operation of the second pre-tensioner mechanisms 27, 28.

Herein, when the vehicle crash has not be detected (S10; No), it is detected whether the DSC still operates or not (S12). When it is detected that the DSC still operates (S12; Yes), the control sequence returns to the step S10. When it is not detected that the DSC operates (S12; No), it is detected whether the brake assist mechanism 10 operates or not (S13). When it is detected that the brake assist mechanism 10 operates (S13; Yes), the control sequence returns to the step S10.

When it is not detected that the brake assist mechanism 10 operates (S13; No), it is detected by the crash pre-detecting sensor 6 whether any obstacle exists in front of the vehicle. When the obstacle exists, the relative speed and relative distance with respect to the obstacle are calculated, and it is detected based on the calculation results whether or not the vehicle is in the dangerous state of crash (S14). When it is detected that the vehicle is in the dangerous state of crash (S14; Yes), the control sequence returns to the step S10.

When it is not detected that the vehicle is in the dangerous state of crash (S14; No), namely when the DSC and the brake assist mechanism 10 are not in their operation state and the dangerous state of crash has been avoided, the electric current is supplied to the electric motors 31, 32 of the first pre-tensioner mechanisms 25, 26 until the specified amount of webbings 21, 22 have been withdrawn (S15, S16; No). When the specified amount of webbings 21, 22 have been withdrawn (S16; Yes), the supply of electric current to the electric motors 31, 32 of the first pre-tensioner mechanisms 25, 26 is stopped (S17), and the control sequence returns.

Next, the operation and effects of the seatbelt device 3 of a vehicle which has been described above will be described. When the vehicle C equipped with the DSC travels on a slippery road or turns at a high speed and thereby the vehicle is in the dangerous state of the spin or lateral slip, the DSC control portion 35 operates to increase or decrease the braking force applied to the wheels 8, thereby stabilizing the vehicle turning state.

In this situation, the first pre-tensioner mechanisms 25, 26 are controlled so that the tension of the webbing 21 of the driver's seat can be lower than that of the webbing 22 of the assistant's seat. Thereby, the driver in the driver's seat 1 can conduct properly the steering or braking operation to avoid the vehicle crash, and the passenger in the assistant's seat 2 can be restrained with the high tension, therefore the safety can be further improved.

Also, at the emergency when the vehicle crash against the obstacle in front needs to be avoided, the first pre-tensioner mechanisms 25, 26 of the driver's seat 1 and the assistant's seat 2 operate to wind up the webbing 21, 22 by the specified amount so that the tension of those can be higher than that of the webbing 21 of the driver's seat at the DSC operation. Thereby, the restraint force for the respective passengers can be increased, and the safety of the passengers can be improved surely even if the vehicle is in the dangerous state where the brake assist mechanism 10 operates.

Also, when it is detected in advance by the crash pre-detecting sensor 6 that the vehicle is in the dangerous state of crash, the first pre-tensioner mechanisms 25, 26 operate so that the tension of the webbing 21 of the driver's seat and the webbing 22 of the assistant's seat can be lower than that when the brake assist mechanism 10 operates. Thereby, the restraint force for the passengers can be increased, and the safety of the passenger can be improved surely. Also, since the mechanisms 25, 26 operate so that the tension of the webbings 21, 22 can be lower than that when the brake assist mechanism 10 operates, the steering operation or the braking operation by the driver in the driver's seat 1 to avoid the vehicle crash will not be prevented. Also, it is not necessary yet to provide the high tension to the webbing 22 of the passenger in the assistant's seat 2 at the timing it is detected in advance that the vehicle is in the generous state of crash, therefore the unpleasant feeling of too much restraint of the webbing 22 can be lessened.

Also, when the vehicle crash is detected by the crash detecting sensor 7, the second pre-tensioner mechanisms 27, 28 operate to increase the restraint force of the passengers. Thereby, the safety of the passengers can be improved surely.

Next, some alternatives in which the above-described embodiment is modified partially will be described.

1) Although the above-described embodiment describes the example in which two seatbelt mechanisms are provided respectively for the driver's seat and the assistant's seat, there may be provided four or more seatbelt mechanisms which are provided for four or more seats respectively.

2) In the above-described embodiment, when the vehicle crash is detected by the crash detecting sensor, the control device supplies the electric current for ignition to the inflator to operate the second pre-tensioner mechanism. However, the electric current for ignition may be supplied to the inflator directly to operate the second pre-tensioner mechanism from the crash detecting sensor, not via the control device.

3) In the above-described embodiment, the webbing is wound up by operating the inflator of the second pre-tensioner mechanism at the vehicle crash. However, the second pre-tensioner mechanism may be omitted. In this case, the electric motor of the first pre-tensioner mechanism can wind up the webbing.

4) Any other modifications and improvements can be applied within the scope of a sprit of the present invention.

What is claimed is:

1. A seatbelt device of a vehicle, comprising:
at least two seatbelt mechanisms provided for a driver's seat and another passenger's seat, each of the seatbelt mechanisms including a webbing and a first pre-tensioner mechanism operative to wind up the webbing so as to apply a specified tension to the webbing when a crash pre-detecting device detects a vehicle crash in advance; and
a control device to control said seatbelt mechanisms,
wherein there is provided a vehicle turning control device which operates to control a braking force of a brake device of the vehicle so that a vehicle turning state can be a target turning state, and said control device operates said first pre-tensioner mechanisms for the driver's seat and another passenger's seat when the vehicle turning control device operates so that the tension of the webbing of the driver's seat is lower than that of the webbing of the passenger's seat.

2. The seatbelt device of a vehicle of claim 1, wherein each of said first pre-tensioner mechanisms is driven by an electric motor.

3. The seatbelt device of a vehicle of claim 1, wherein there are provided a crash detecting device to detect the vehicle crash and second pre-tensioner mechanisms which are provided at said respective seatbelt mechanisms to wind up a specified amount of webbing at the vehicle crash, and said seatbelt device is constituted so that when the vehicle crash is detected by said crash detecting device, said second pre-tensioner mechanisms operate in addition to the operation of said first pre-tensioner mechanisms.

4. The seatbelt device of a vehicle of claim 3, wherein each of said second pre-tensioner mechanisms is driven by an inflator.

5. A seatbelt device of a vehicle, comprising:
a seatbelt mechanism provided for a driver's seat, the seatbelt mechanisms including a webbing and a first pre-tensioner mechanism operative to wind up the webbing so as to apply a specified tension to the webbing when a crash pre-detecting device detects a vehicle crash in advance;
a vehicle turning control device which operates to control a braking force of a brake device of the vehicle so that a vehicle turning state can be a target turning state;
a brake assist device which operates to assist a braking operation by a driver so that the braking force of the brake device can be increased to a specified large braking force when a brake pedal is pressed at an emergency; and
a control device to control said seatbelt mechanism,
wherein said control device operates said first pre-tensioner mechanism at least when the vehicle turning control device operates and when the brake assist device operates so that the tension of the webbing of the driver's seat when said brake assist device operates is higher than that of the webbing of the driver's seat when said vehicle turning control device operates.

6. A seatbelt device of a vehicle, comprising:
a seatbelt mechanism provided for a driver's seat, the seatbelt mechanisms including a webbing and a first pre-tensioner mechanism operative to wind up the webbing so as to apply a specified tension to the webbing when a crash pre-detecting device detects a vehicle crash in advance;
a vehicle turning control device which operates to control a braking force of a brake device of the vehicle so that a vehicle turning state can be a target turning state;
a brake assist device which operates to assist a braking operation by a driver so that the braking force of the brake device is increased to a specified large braking force when a brake pedal is pressed at an emergency; and
a control device to control said seatbelt mechanism,
wherein said control device operates said first pre-tensioner mechanism at least when the vehicle turning control device operates and when the brake assist device operates, and
said control device operates said first pre-tensioner mechanisms so that the tension of the webbing of the driver's seat the vehicle crash is detected in advance by the crash pre-detecting device is lower than that of the webbing of the driver's seat when said brake assist device operates.

* * * * *